Jan. 12, 1971 P. MARCUS 3,555,134
METHOD FOR FORMING PLASTIC CONTAINERS HAVING
THICKENED BOTTOM RIMS
Filed Oct. 6, 1967 2 Sheets-Sheet 2

INVENTOR.
PAUL MARCUS
BY Brumbaugh, Free,
Graves & Donohue
his ATTORNEYS

United States Patent Office 3,555,134
Patented Jan. 12, 1971

3,555,134
METHOD FOR FORMING PLASTIC CONTAINERS HAVING THICKENED BOTTOM RIMS
Paul Marcus, Pearl River, N.Y., assignor to APL Corporation, Brooklyn, N.Y., a corporation of New York
Filed Oct. 6, 1967, Ser. No. 673,449
Int. Cl. B29c *17/07, 24/00*
U.S. Cl. 264—97                           1 Claim

ABSTRACT OF THE DISCLOSURE

A plastic container is formed by expanding a parison in a blow mold. The part of the blow mold that shapes the bottom of the container is a movable flapper. After the expansion of the parison is completed, the flapper is moved inwardly against the bottom of the container to increase the thickness of the plastic material at the bottom rim of the container and thereby increase the strength of the container. The flapper is then retracted and the container removed.

BACKGROUND OF THE INVENTION

This invention relates to molding methods, and more particularly, to novel and highly-efficient methods facilitating injection-blow molding of plastic containers having unusual strength in the vicinity of the bottom rim.

A serious deficiency of conventional injection-blow molding methods is that plastic bottles and other containers made in accordance therewith tend to be relatively weak in the vicinity of the bottom rim. This problem is particularly acute in the case of containers having concave bottoms (as viewed from outside the containers) and in cases involving a long deep draw; i.e., considerable expansion of the height of the side wall of the container during the expansion or blow stage.

The problem of a weakened structure in the vicinity of the bottom rim arises because the parison must expand more in the vicinity of the bottom rim than in other areas, and the additional expansion results in an additional attenuation or thinning out of the mold substance during the expansion stage.

SUMMARY OF THE INVENTION

A principal object of the present invention is to remedy the shortcoming of conventional methods noted above and, more particularly, to facilitate the fabrication of a plastic container in which the plastic material has adequate thickness in the vicinity of the bottom rim of the container to provide the requisite strength notwithstanding expansion of the plastic material during the blow stage.

The foregoing and other objects are attained in accordance with the invention by injecting a mold substance into a mold cavity to form wall means defining a parison and blowing a fluid into the parison to expand the parison to form a container, thereby increasing the surface area of the wall means and decreasing the thickness of at least a portion of the wall means. The expanded wall means includes a sidewall and a bottom wall, the sidewall and bottom wall being contiguous with each other at a bottom rim. After the completion of the expansion, the bottom wall is forced inwardly in accordance with the the invention to reduce slightly the surface area of the wall means and increase the thickness of the wall means in the vicinity of the bottom rim.

BRIEF DESCRIPTION OF THE DRAWING

An understanding of additional aspects of the invention may be gained from a consideration to the following detailed description of a representative embodiment thereof, in conjunction with the accompanying figures of the drawing, in which:

FIG. 1A is a schematic representation of suitable means for forming a parison for use in accordance with the invention;

FIG. 4 is a schematic representation of the apparatus of FIGS. 2 and 3 in a retracted position.

DESCRIPTION OF THE PREFERRED EMBODIMENT

Figure 1:
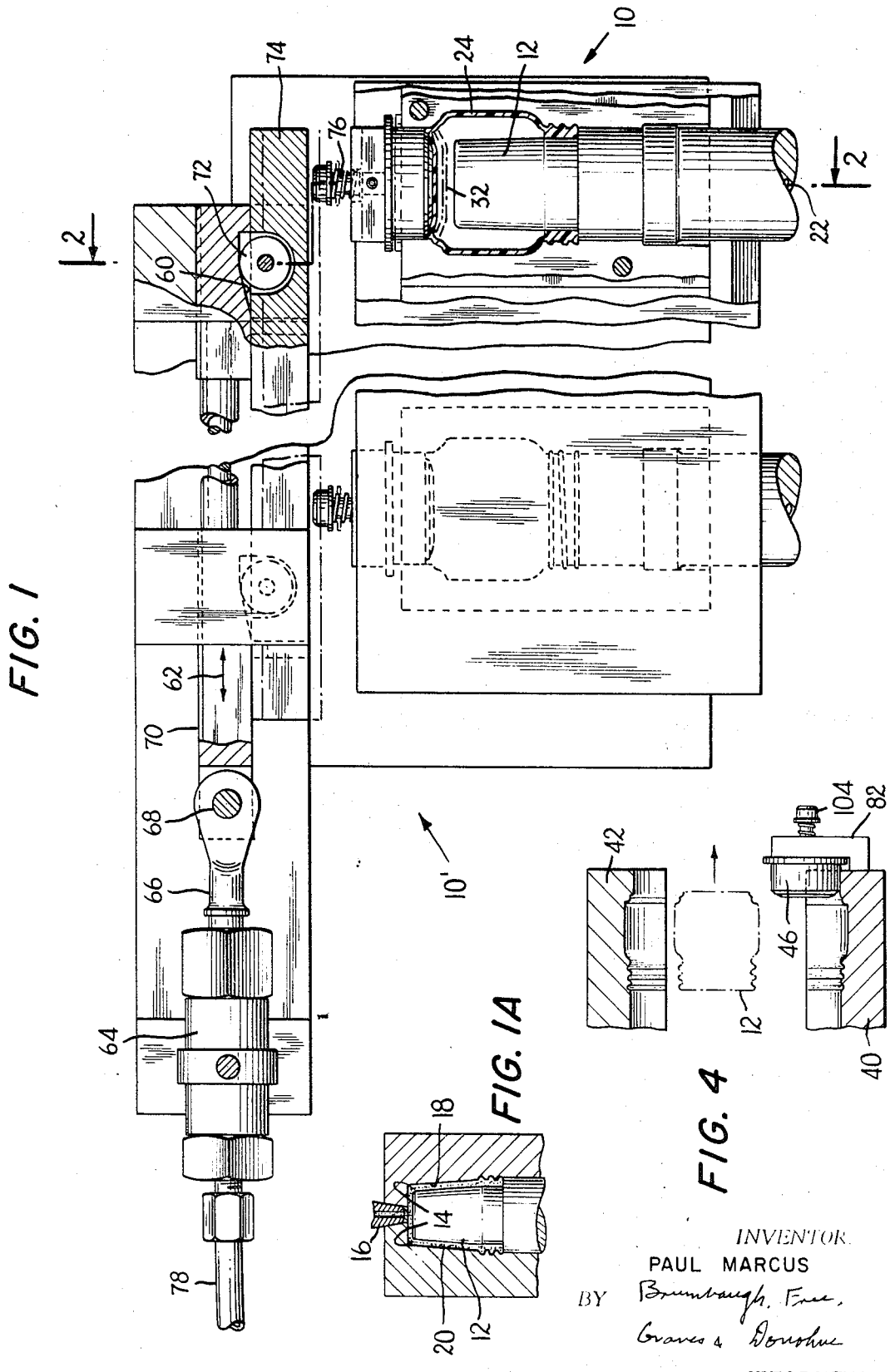
FIG. 1 is an elevational view, partly in section, of a preferred embodiment of apparatus constructed in accordance with the invention.

FIG. 1 shows apparatus 10 constructed in accordance with the invention. The apparatus includes a plurality of mold cores such as a mold core 12 shown at the right of the figure.

At a stage of the manufacturing process prior to the stage illustrated in FIG. 1, a mold substance 14 is injected through a nozzle 16 into an injection mold cavity 18 to form a parison 20 on the mold core 12, as shown in FIG. 1A.

Figure 2:
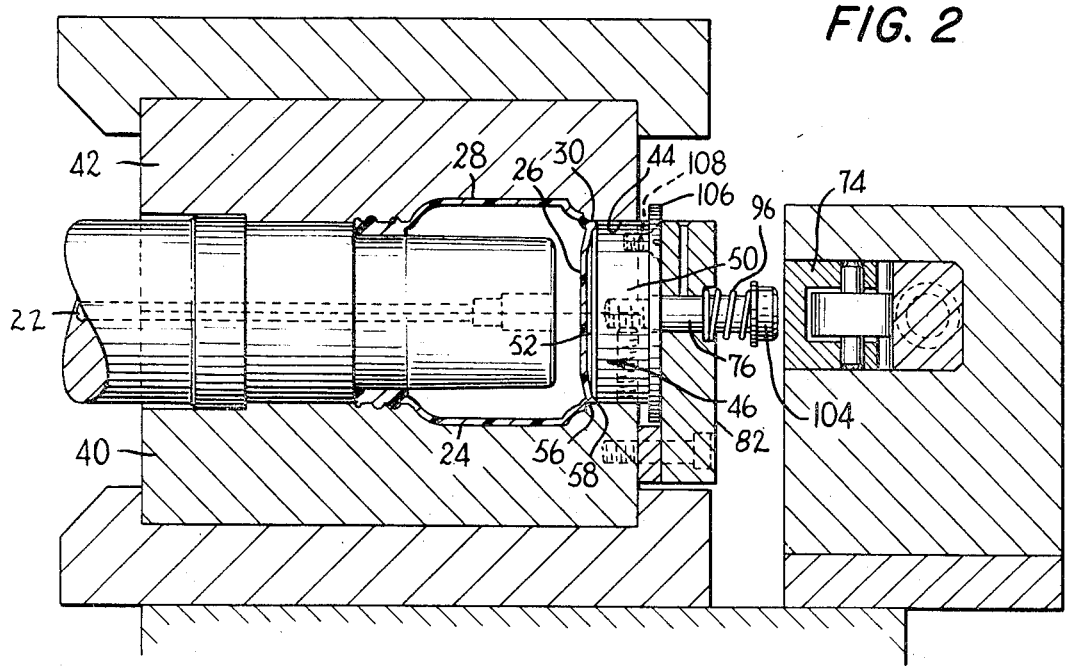
FIG. 2 is a sectional view taken generally along the line 2—2 of FIG. 1 and looking in the direction of the arrows.

As FIG. 2 shows, an air passage 22 is provided extending the length of the mold core 12 and facilitating expansion fo the parison 20 to form a bottle or other container 24.

It is frequently desirable to give the resulting container 24 a concave bottom wall 26, as shown in FIG. 2. The container 24 typically has a sidewall 28 of generally cylindrical configuration, and the sidewall 28 and bottom wall 26 are contiguous with each other at a bottom rim 30. Inspection of FIG. 2 makes it evident that the expansion of the parison to form the container 24 tends to result in greater thinning out or attenuation of the mold substance in the vicinity of the bottom rim 30 than at other parts of the container 24.

The attenuation of the mold substance in the vicinity of the bottom rim 30 is particularly detrimental because the bottom rim is subjected to greater shock and stress than many other parts of the container during storage and use.

In accordance with the invention, the bottom wall 26 is pushed inwardly following the completion of the expansion stage to a position indicated by broken lines 32 in FIG. 1. This inward movement of the bottom wall 26 reduces slightly the surface area of wall means 38 and increases the thickness of the wall means in the vicinity of the bottom rim 30. See FIG. 3.

In carrying out the method of the invention, use is made of expansion mold sections 40 and 42 which together constitute a peripheral portion of the expansion mold means. See FIG. 2. The peripheral mold portion is formed with aperture-defining means 44 therein adapted to receive a flapper 46.

The peripheral portion of the mold constituted by the mold sections 40 and 42 and the flapper 46 of the mold limit the expansion of the parison and give the container 24 its final shape.

The flapper 46 includes a base portion 50 and a convex portion 52. The base portion 50 is snugly slidable within the aperture-defining means 44, and the convex portion 52 is centered on the base portion 50 in facing relation to the parison so as to impart a generally concave shape to the bottom wall 26 of the container 24 as viewed from outside the container.

In accordance with the invention, the flapper 46 is movable between a blowing position, an advanced position, and a retracted position.

The blowing position of the flapper 46 is best illustrated in FIG. 2. The base portion 50 of the flapper 46 is recessed within the aperture-defining means 44 as seen from the position of the container 24 when the flapper 46 is in the blowing position of FIG. 2.

Figure 3:
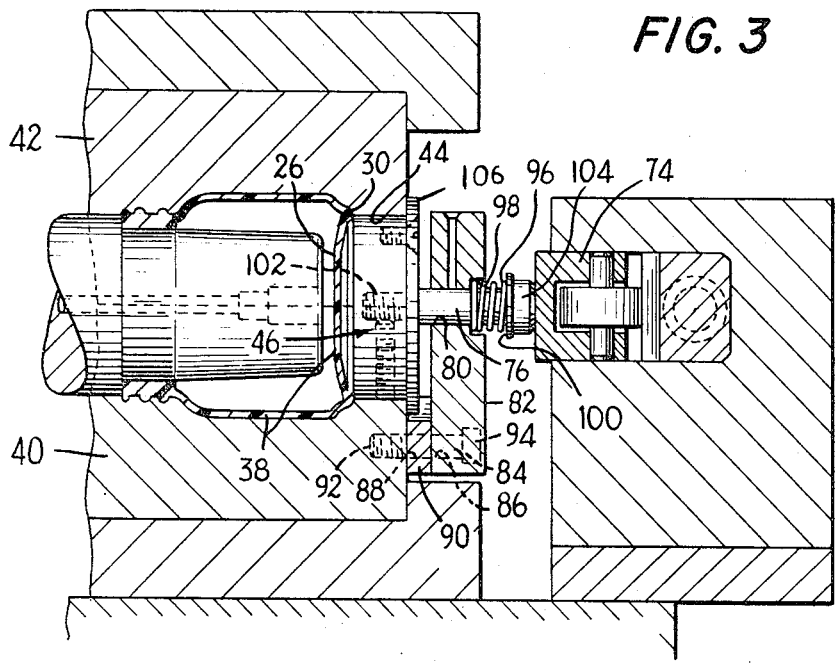
FIG. 3 is a view similar to FIG. 2 showing the apparatus in a different stage of its operation.

As FIG. 3 shows, on the other hand, the base portion 50 of the flapper 46 is flush with the aperture-defining means 44 when the flapper 46 is in the advanced position illustrated in that figure.

That is, in the blowing position illustrated in FIG. 2, there is a separation along the direction of the axis of the container 24 between the plane of the circle 56 marking the left-hand limit (as seen in FIGS. 2 and 3) of the aperture-defining means 44 and the plane of the circle 58 marking the left-hand end (as seen in FIGS. 2 and 3) of the base portion 50 of the flapper 46, whereas, in the advanced position shown in FIG. 3, there is no such separation.

Cam means 60, well shown in FIG. 1, is provided for moving the flapper from the blowing position to the advanced position. The cam means 60 is movable in directions indicated by the double-headed arrow 62 by suitable actuating means such as a pneumatic or hydraulic piston-cylinder assembly 64 having a ram extension 66 coupled by a connection 68 to a rod 70. The cam means 60 is rigidly connected to the rod 70.

Accordingly, actuation of the piston-cylinder assembly 64 through a connecting line 78 moves the rod 70 and the cam means 60 to the right (as seen in FIG. 1) to move the flapper 46 from the blowing position to the advanced position and to the left (as seen in FIG. 1) to facilitate movement of the flapper 46 from the advanced position to the blowing position.

A roller or cam follower 72 rides on the cam means 60 and is journaled within a block 74 adapted to make contact with a pin 76 rigidly connected to the flapper 46.

The pin 76 passes through an aperture 80 formed in a plate 82. The plate 82 is securely held to the mold section 40 by a screw 84 passed through an aperture 86 in the plate 82, an aperture 88 in a spacer block 90, and a threaded aperture 92 in the mold section 40. The screw 84 has an enlarged head 94 countersunk in the plate 82 to prevent the plate 82 from being stripped over the screw 84.

As FIG. 4 shows, when the mold sections 40 and 41 are separated from each other by rotation or translation or the combination of the two movements, the flapper 46 moves with the mold section 40 relatively to the mold section 41 and is effectively retracted permitting removal of the container 24.

The pin 76 is urged to the right as seen in FIGS. 2 and 3 by a compression coil spring 96 abutting a recess 98 at one end and a ring or flange 100 at the other. Since the pin 76 is rigidly secured to the flapper 46 by suitable means such as threads 102, the flapper 46 moves with the pin 76.

FIG. 2 illustrates the flapper 46 in the blowing position. In this position, the block 74 is in spaced-apart relation to the head 104 of the pin 76, and the compression coil spring 96 urges the pin 76 and flapper 46 to the right as seen in the figure until a plate 106 integral by virtue of suitable means such as a screw 108 with the flapper 46 abuts the plate 82.

The camming action described above is adapted to move the flapper 46 from the blowing position illustrated in FIG. 2 to the advanced position illustrated in FIG. 3. Specifically, movement of the cam means 60 to the right as seen in FIG. 1 brings the block 74 into contact with the head 104 of the pin 76 as shown in FIG. 3 and forces the pin 76 and flapper 46 to the left, compressing the compression coil spring 96 until the plate 106 abuts the mold sections 40 and 42.

The movement of the flapper 46 to the left brings the circles 56 and 58 into the same plane in the manner described above and reduces slightly the surface area of the wall means 38 of the container 24 in the vicinity of the bottom rim 30. This significantly increases the strength of the container 24 in the vicinity of the bottom rim 30, notwithstanding the considerable expansion of the parison in the vicinity of the bottom rim 30 during the expansion stage. The well-known advantages of injection-blow molding formation of plastic containers are therefore achieved without a significant customary attendant disadvantage.

The flapper 46 is retractable to facilitate removal of the completed container 24 by virtue of the connection between the flapper 46 and the mold section 40. Opening of the mold sections 40 and 42 simultaneously and automatically effects retraction of the flapper 46.

Thus there is provided in accordance with the invention a novel and highly-effective method and apparatus facilitating injection-blow molding of containers having unusual strength in the vicinity of the bottom rim without the employment of inordinate quantities of mold substance in the formation of the containers. The apparatus of the invention is economical to manufacture and repair and lends itself to mass production by the arrangement of a multiplicity of devices 10' (FIG. 1) similar to the device 10 described above for simultaneous actuation.

The method and apparatus of the invention are particularly useful when a long deep draw is necessary during the expansion stage: that is, when considerable attenuation of the mold substance in the vicinity of the bottom rim is especially likely to occur.

Many modifications within the spirit and scope of the invention of the representative embodiment described above will readily occur to those skilled in the art. Accordingly, the invention is to be construed as including all of the embodiments thereof within the scope of the appended claim.

I claim:

1. A method of forming a plastic article comprising the steps of injecting a mold substance into an injection mold cavity to form wall means defining a parison, removing said parison from said injection mold cavity and transferring said parison to an expansion mold cavity including aperture-defining means and a movable flapper formed with a base portion slidable in said aperture-defining means, adjusting said flapper so that said base portion is recessed within said aperture-defining means, blowing a fluid into said parison to expand said parison to form a container, thereby increasing the surface area of said wall means and decreasing the thickness of at least a portion of said wall means, said expanded wall means including a sidewall and a bottom wall, said sidewall and bottom wall being contiguous with each other at a bottom rim, then advancing said flapper so that said base portion is flush with said aperture-defining means and said bottom wall is forced inwardly to reduce the surface area of said wall means and increase the thickness of said wall means in the vicinity of said bottom rim, and finally opening said expansion mold cavity to free said container adjacent to said bottom wall and removing said container.

References Cited

UNITED STATES PATENTS

| | | | |
|---|---|---|---|
| 3,050,773 | 8/1962 | Hagen | 264—98 |
| 3,172,929 | 3/1965 | Santelli | 264—97 |
| 3,214,797 | 11/1965 | Ollier et al. | 264—296X |
| 3,234,310 | 2/1966 | Edwards | 264—296X |

ROBERT F. WHITE, Primary Examiner

J. H. SILBAUGH, Assistant Examiner

U.S. Cl. X.R.

18—5; 264—296